(12) United States Patent
Kuenzi et al.

(10) Patent No.: US 11,341,795 B2
(45) Date of Patent: *May 24, 2022

(54) CAPTURING BEHAVIORAL USER INTENT WHEN INTERACTING WITH MULTIPLE ACCESS CONTROLS

(71) Applicant: Carrier Corporation, Palm Beach Gardens, FL (US)

(72) Inventors: Adam Kuenzi, Silverton, OR (US); Jonah J. Harkema, Newberg, OR (US); Steve Switzer, Atlanta, GA (US)

(73) Assignee: Carrier Corporation, Palm Beach Gardens, FL (US)

( * ) Notice: Subject to any disclaimer, the term of this patent is extended or adjusted under 35 U.S.C. 154(b) by 737 days.

This patent is subject to a terminal disclaimer.

(21) Appl. No.: 16/092,308

(22) PCT Filed: Apr. 5, 2017

(86) PCT No.: PCT/US2017/026112
§ 371 (c)(1),
(2) Date: Oct. 9, 2018

(87) PCT Pub. No.: WO2017/180388
PCT Pub. Date: Oct. 19, 2017

(65) Prior Publication Data
US 2021/0209882 A1 Jul. 8, 2021

Related U.S. Application Data

(60) Provisional application No. 62/320,742, filed on Apr. 11, 2016.

(51) Int. Cl.
*G07C 9/00* (2020.01)
*H04W 88/02* (2009.01)

(52) U.S. Cl.
CPC ..... *G07C 9/00904* (2013.01); *G07C 9/00182* (2013.01); *G07C 9/00571* (2013.01); *G07C 2009/00769* (2013.01); *H04W 88/02* (2013.01)

(58) Field of Classification Search
CPC ............ G07C 9/00904; G07C 9/00571; G07C 9/00182; G07C 2009/00769;
(Continued)

(56) References Cited

U.S. PATENT DOCUMENTS 5,909,183 A * 6/1999 Borgstahl ............... G08C 19/28
340/12.29
6,552,649 B1 4/2003 Okada et al.
(Continued)

FOREIGN PATENT DOCUMENTS

CN 102691443 A 9/2012
CN 103135762 A 6/2013
(Continued)

OTHER PUBLICATIONS

Chinese Office Action dated Dec. 1, 2020 issued for related Chinese Patent Application CPEL1853389P.
(Continued)

*Primary Examiner* — Edwin C Holloway, III
(74) *Attorney, Agent, or Firm* — Bachman & LaPointe, P.C.

(57) ABSTRACT

A method of advertisement filtering including receiving advertisements from a multiple of access controls; filtering the received advertisements based on a credential on the mobile device; comparing the filtered received advertisements and determining a user intent to access a particular access control in response to the comparing and to a destination intent.

18 Claims, 8 Drawing Sheets

(58) Field of Classification Search
CPC ............ G07C 9/00309; G07C 2209/04; G07C 2209/63; G07C 9/00896; H04W 88/02; H04W 4/00

USPC .................................................... 340/5.61

See application file for complete search history.

(56) References Cited

U.S. PATENT DOCUMENTS

| | | | |
|---|---|---|---|
| 6,717,528 B1* | 4/2004 | Burleson | G08C 17/02 340/12.22 |
| 7,583,191 B2 | 9/2009 | Zinser | |
| 7,606,558 B2 | 10/2009 | Despain et al. | |
| 8,504,103 B2 | 8/2013 | Ficquette | |
| 8,635,462 B2 | 1/2014 | Ullmann | |
| 8,774,714 B2 | 7/2014 | Metivier | |
| 8,791,790 B2 | 7/2014 | Robertson et al. | |
| 8,825,021 B2 | 9/2014 | Wang | |
| 8,903,425 B2 | 12/2014 | Guenec et al. | |
| 8,929,861 B2 | 1/2015 | Carbonell Duque et al. | |
| 8,935,052 B2 | 1/2015 | Hermann | |
| 8,988,350 B2 | 3/2015 | Karmarkar et al. | |
| 9,007,173 B2 | 4/2015 | McIntyre | |
| 9,041,511 B2 | 5/2015 | Gaviria Velez et al. | |
| 9,053,622 B2 | 6/2015 | Scalisi | |
| 9,057,210 B2 | 6/2015 | Dumas et al. | |
| 9,065,987 B2 | 6/2015 | Kasmir et al. | |
| 9,129,450 B2 | 9/2015 | Robertson et al. | |
| 9,179,108 B1 | 11/2015 | Scalisi et al. | |
| 9,179,109 B1 | 11/2015 | Kasmir et al. | |
| 9,443,365 B2 | 9/2016 | Ahearn et al. | |
| 9,449,448 B2 | 9/2016 | Anderson | |
| 9,501,880 B2 | 11/2016 | Handville et al. | |
| 9,548,973 B2 | 1/2017 | Hulusi et al. | |
| 9,600,949 B2 | 3/2017 | Conrad et al. | |
| 9,613,478 B2 | 4/2017 | Dumas et al. | |
| 9,824,578 B2 | 11/2017 | Burton et al. | |
| 9,852,559 B2 | 12/2017 | Rettig et al. | |
| 9,852,561 B2 | 12/2017 | Dumas et al. | |
| 9,886,569 B1 | 2/2018 | Vazquez et al. | |
| 9,942,840 B2 | 4/2018 | Smith et al. | |
| 10,015,653 B2 | 7/2018 | Lang et al. | |
| 10,027,680 B1 | 7/2018 | Saylor | |
| 10,084,775 B1 | 9/2018 | Vazquez et al. | |
| 10,127,754 B2 | 11/2018 | Child et al. | |
| 10,274,909 B2 | 4/2019 | Lyman | |
| 10,325,427 B2 | 6/2019 | Dyne | |
| 10,789,392 B2 | 9/2020 | Kupiec et al. | |
| 10,791,444 B2* | 9/2020 | Kuenzi | G06Q 30/0251 |
| 11,043,054 B2 | 6/2021 | Kuenzi et al. | |
| 2005/0068159 A1 | 3/2005 | Hung | |
| 2005/0241003 A1 | 10/2005 | Sweeney et al. | |
| 2006/0143463 A1 | 6/2006 | Ikeda et al. | |
| 2007/0109093 A1 | 5/2007 | Matsubara et al. | |
| 2007/0176739 A1 | 8/2007 | Raheman | |
| 2008/0139116 A1* | 6/2008 | Balgard | G08C 17/02 455/41.2 |
| 2010/0283579 A1* | 11/2010 | Kraus | G07C 9/00944 340/5.7 |
| 2010/0306549 A1 | 12/2010 | Ullmann | |
| 2011/0043362 A1 | 2/2011 | Reibel | |
| 2011/0311052 A1 | 12/2011 | Myers et al. | |
| 2012/0044049 A1 | 2/2012 | Vig et al. | |
| 2012/0146918 A1* | 6/2012 | Kreiner | G06F 3/0481 345/173 |
| 2012/0154108 A1* | 6/2012 | Sugaya | G06F 9/451 340/5.1 |
| 2012/0169461 A1 | 7/2012 | Dubois, Jr. | |
| 2012/0280783 A1 | 11/2012 | Gerhardt et al. | |
| 2012/0280790 A1 | 11/2012 | Gerhardt et al. | |
| 2013/0008958 A1 | 1/2013 | Smith et al. | |
| 2013/0045763 A1 | 2/2013 | Ruiz | |
| 2013/0057695 A1 | 3/2013 | Huisking | |
| 2013/0125231 A1 | 5/2013 | Kuenzi | |
| 2013/0135196 A1 | 5/2013 | Park et al. | |
| 2013/0139561 A1 | 6/2013 | Parto et al. | |
| 2013/0176107 A1* | 7/2013 | Dumas | G07C 9/00571 340/5.61 |
| 2013/0203348 A1 | 8/2013 | Lim | |
| 2013/0257589 A1 | 10/2013 | Mohiuddin et al. | |
| 2014/0049361 A1 | 2/2014 | Ahearn et al. | |
| 2014/0049364 A1* | 2/2014 | Ahearn | G07C 9/00174 340/5.51 |
| 2014/0049369 A1 | 2/2014 | Ahearn et al. | |
| 2014/0053248 A1 | 2/2014 | Hulusi et al. | |
| 2014/0118107 A1 | 5/2014 | Almomani | |
| 2014/0181955 A1 | 6/2014 | Rosati | |
| 2014/0219453 A1 | 8/2014 | Neafsey et al. | |
| 2014/0292483 A1 | 10/2014 | Kim | |
| 2014/0375421 A1 | 12/2014 | Morrison et al. | |
| 2015/0027178 A1 | 1/2015 | Scalisi | |
| 2015/0035987 A1 | 2/2015 | Fernandez | |
| 2015/0048926 A1 | 2/2015 | Vincent et al. | |
| 2015/0098629 A1 | 4/2015 | Perna et al. | |
| 2015/0102902 A1 | 4/2015 | Chen | |
| 2015/0193731 A1 | 7/2015 | Stevens et al. | |
| 2015/0213661 A1 | 7/2015 | Robertson et al. | |
| 2015/0228134 A1* | 8/2015 | Tehranchi | G07C 9/27 340/5.61 |
| 2015/0269797 A1* | 9/2015 | Kauffmann | G07C 9/00309 340/5.61 |
| 2016/0042333 A1 | 2/2016 | Ho et al. | |
| 2016/0049024 A1* | 2/2016 | Johnson | H04W 4/029 340/5.7 |
| 2017/0330226 A1 | 11/2017 | Kuenzi et al. | |
| 2019/0182672 A1 | 6/2019 | Kuenzi et al. | |
| 2019/0340852 A1 | 11/2019 | Kuenzi et al. | |
| 2020/0349785 A1* | 11/2020 | Kuenzi | G07C 9/00571 |
| 2020/0351661 A1* | 11/2020 | Kuenzi | G06Q 30/0267 |

FOREIGN PATENT DOCUMENTS

| | | |
|---|---|---|
| CN | 103489245 A | 1/2014 |
| CN | 104063930 A | 9/2014 |
| EP | 2620919 A1 | 7/2013 |
| EP | 2725823 A1 | 4/2014 |
| EP | 2991041 A2 | 3/2016 |
| JP | 3729007 B2 | 12/2005 |
| JP | 2006161473 A | 6/2006 |
| KR | 101267342 B1 | 5/2013 |
| WO | 2013/093638 A2 | 6/2013 |
| WO | 2015/036653 A1 | 3/2015 |
| WO | 2015/191190 A1 | 12/2015 |
| WO | 2016/089837 A1 | 6/2016 |
| WO | 2019174170 A1 | 9/2019 |

OTHER PUBLICATIONS

Chinese Office Action dated Dec. 1, 2020 issued for related Chinese Patent Application CPEL1853390P.

Chinese Office Action dated Dec. 1, 2020 issued for related Chinese Patent Application CPEL1853391P.

https://www.kwikset.com/kevo/default#.Vnwb2_krKUk.

https://lockitron.com/.

https://www.unikey.com/.

http://gojiaccess.com.

International Search Report for PCT/US2017/026112 dated Jun. 23, 2017.

U.S. Non-Final Office Action dated Sep. 17, 2020 for related U.S. Appl. No. 16/092,307.

U.S. Non-Final Office Action dated Oct. 8, 2020 for related U.S. Appl. No. 16/092,305.

U.S. Final Office Action dated Apr. 16, 2021 issued for related U.S. Appl. No. 16/092,307.

U.S.Notice of Allowance dated Jun. 30, 2021 issued for corresponding U.S. Appl. No. 16/092,307.

U.S. Non-Final Office Action dated May 14, 2021 issued for corresponding U.S. Appl. No. 16/092,309.

* cited by examiner

CAPTURING BEHAVIORAL USER INTENT WHEN INTERACTING WITH MULTIPLE ACCESS CONTROLS

BACKGROUND

The present disclosure relates generally to access control systems, and more particularly, to a system and a method of capturing user intent when interacting with multiple access controls.

An access control system is typically operated by encoding data on a physical key card that indicates access rights. Some access control systems are online where the reader can use some means to communicate with the access control system. In online systems the access rights are usually a reference identifier. Other access control systems are offline and the access rights are encoded as data that can be decoded and interpreted by the offline lock to retrieve the access rights. An example is a hotel locking system where a front desk encodes a guest card and an offline, battery powered lock on a guest room door has the means to decode the key card and permit or deny access based on the encoded access rights. Some methods of encoding access rights include sequencing where subsequent access rights have a sequence number that is greater than the prior access rights.

Various mobile devices have been utilized to open locks via an infrared 'beam' to the lock, which provides directionality, or a 'push the button' on the box to wake up the lock for subsequent communication over Bluetooth. With the capability present in Bluetooth Low Energy (BTLE) to communicate with very low power, new system architectures require the lock to be 'always on' and sending periodic BTLE advertisements, such as once per second. The very low power requirements result in many years of battery life. With this setup, a user would not need to 'push a button' to wake the lock up—it is already awake, however, in environments where there are multiple locks within range of the mobile device such as in a Hotel, each user may receive the advertisement from a significant number of locks thereby complicating the capture of user intent.

SUMMARY

A method of advertisement filtering according to one disclosed non-limiting embodiment of the present disclosure can include receiving advertisements from each of a multiple of access controls on a mobile device; filtering the received advertisements based on a credential on the mobile device; comparing the filtered received advertisements; and determining a user intent to access a particular access control in response to the comparing and to a behavioral intent.

A further embodiment of the present disclosure may include wherein the access control is a lock.

A further embodiment of the present disclosure may include wherein the mobile device is a smartphone.

A further embodiment of the present disclosure may include sorting the filtered received advertisements based on a RSSI (received signal strength indicator).

A further embodiment of the present disclosure may include wherein the behavioral intent is a prior behavior.

A further embodiment of the present disclosure may include wherein the prior behavior includes a time of day which the user had previously accessed the access control.

A further embodiment of the present disclosure may include wherein the prior behavior includes a route previously taken by the user.

A further embodiment of the present disclosure may include wherein the prior behavior includes a location at which the user had previously accessed the access control.

A further embodiment of the present disclosure may include wherein the behavioral intent is based on a proximity to other users.

A further embodiment of the present disclosure may include wherein the behavioral intent is related to the most accessed access control.

An access control system according to one disclosed non-limiting embodiment of the present disclosure can include a multiple of access controls; and a mobile device in communication with the multiple of access controls, the mobile device operable to determine a user intent to access a particular access control of the multiple of access controls based at least in part on a behavioral intent.

A further embodiment of the present disclosure may include wherein the behavioral intent is based at least in part on an accelerometer in the mobile device.

A further embodiment of the present disclosure may include wherein the behavioral intent is based at least in part on a GPS in the mobile device.

A further embodiment of the present disclosure may include wherein the behavioral intent is based at least in part on a time of day which the user had previously accessed the access control.

A further embodiment of the present disclosure may include wherein the behavioral intent is based at least in part on a location of the mobile device at which the user had previously accessed the access control.

A further embodiment of the present disclosure may include wherein the behavioral intent is based at least in part on communication between the mobile device and a passenger conveyance.

A further embodiment of the present disclosure may include wherein the passenger conveyance is an elevator.

A further embodiment of the present disclosure may include wherein the behavioral intent is based at least in part on a location of the mobile device with respect to another user device.

A further embodiment of the present disclosure may include wherein the behavioral intent is related to an identifier of a previously opened access control.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
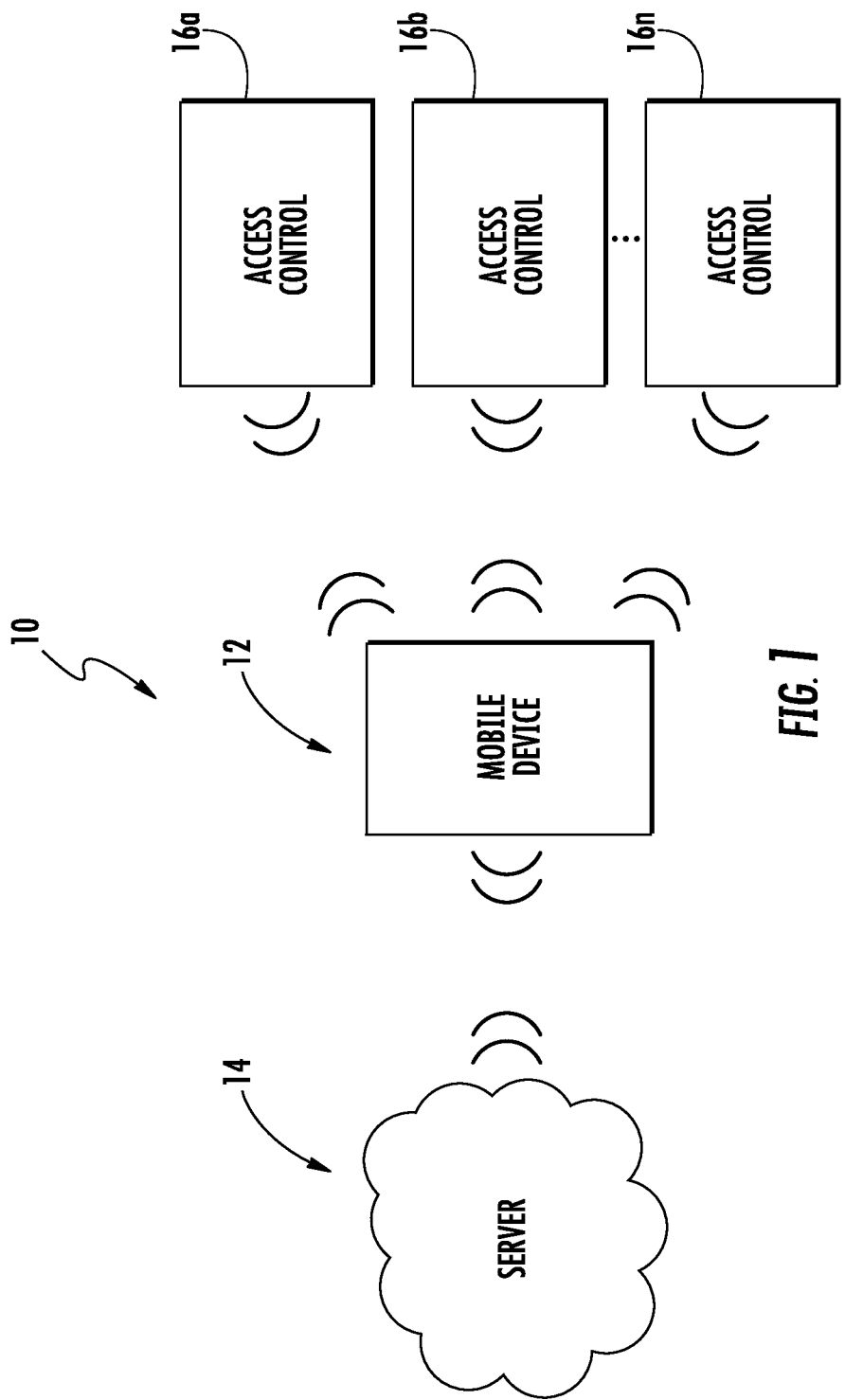
FIG. 1 is a general schematic system diagram of a user authentication system.

FIG. 1 schematically illustrates an access control system 10. The system 10 generally includes a mobile device 12, a server 14, and a plurality of access controls 16, schematically illustrated as 16a, 16b, . . . , 16n. It should be appreciated that, although particular systems are separately defined in the schematic block diagrams, each or any of the systems may be otherwise combined or separated via hardware and/or software.

The mobile device 12 is a wireless capable handheld device such as a smartphone that is operable to communicate with the server 14 and the access controls 16. The server 14 may provide credentials and other data to the mobile device 12, such as firmware or software updates to be communicated to one or more of the access controls 16. Although the server 14 is depicted herein as a single device, it should be appreciated that the server 14 may alternatively be embodied as a multiplicity of systems, from which the mobile device 12 receives credentials and other data.

Each access control 16 is a wireless-capable, restricted-access, or restricted-use device such as wireless locks, access control readers for building entry, electronic banking controls, data transfer devices, key dispenser devices, tool dispensing devices, and other restricted-use machines. The mobile device 12 submits credentials to the access controls 16, thereby selectively permitting a user to access or activate functions of the access controls 16. A user may, for example, submit a credential to an electromechanical lock to unlock it, and thereby gain access to a restricted area. In another example, a user may submit a credential to an electronic banking control to withdraw funds. In still another example, the user may submit the credential to a unit that dispenses key cards with data associated with or data retrieved from the credential. A mobile device 12 may store credentials for one or all or other of the examples noted above, and in addition may store a plurality of credentials for each type of application at the same time. Some credentials may be used for multiple access controls 16. For example, a plurality of electronic locks in a facility may respond to the same credential. Other credentials may be specific to a single access control 16.

Figure 2:
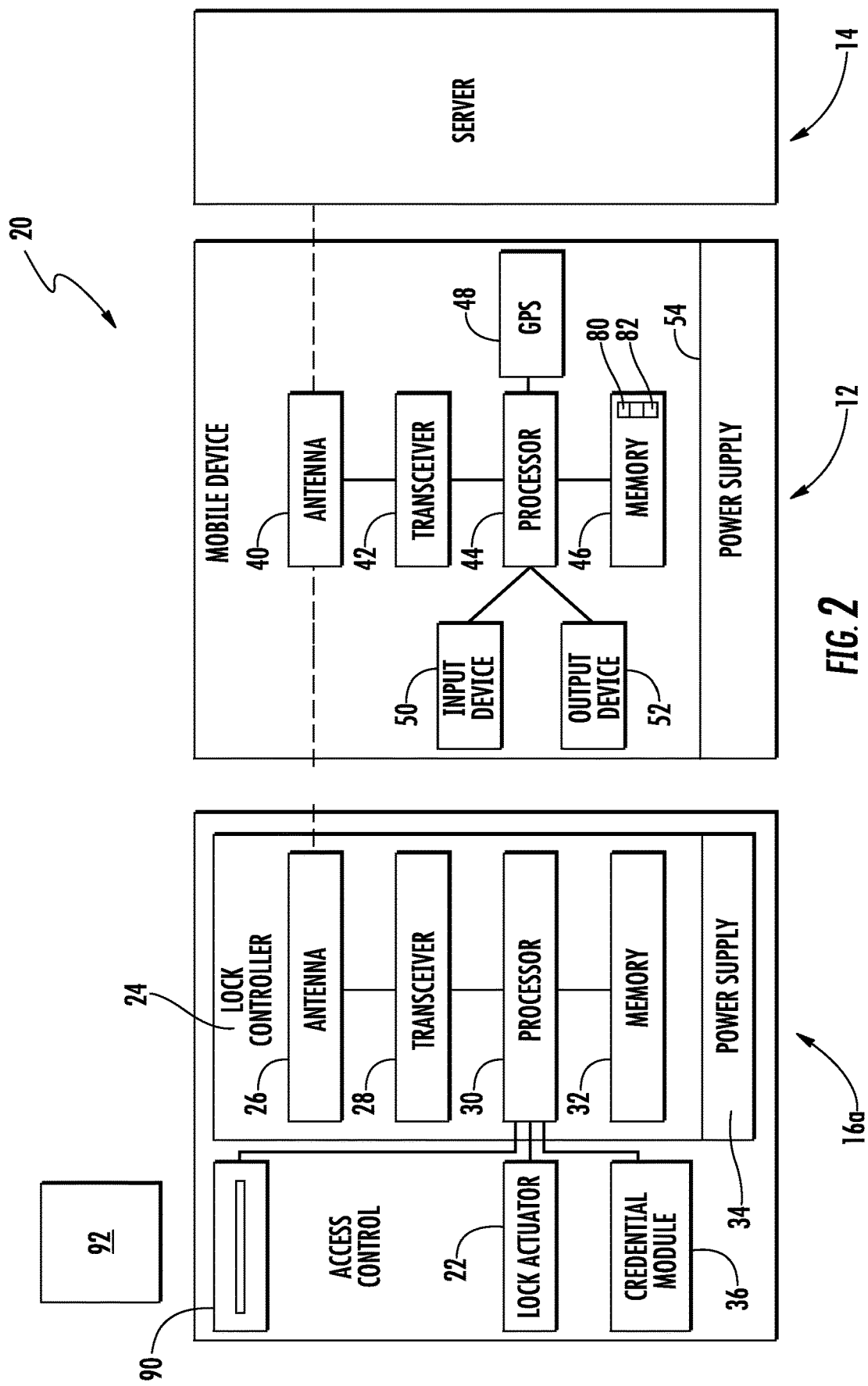
FIG. 2 is a block diagram of the user authentication system.

With reference to FIG. 2, a block diagram of an example electronic lock system 20 includes the access control 16a, the mobile device 12, and the server 14. The access control 16a generally includes a lock actuator 22, a lock controller 24, a lock antenna 26, a lock transceiver 28, a lock processor 30, a lock memory 32, a lock power supply 34, a lock card reader 90 and a credential module 36. The access control 16a is responsive to credentials from the mobile device 12, and may, for example, be the lock of a lockbox, a door lock, or a lock core. Although the present disclosure focuses primarily on credentials for access control, it should be appreciated that other systems wherein credentials are transmitted from a mobile device to an access control so as to identify the user to an online system or validate user access rights or permissions in an offline system will benefit herefrom. Such systems include virtual or electronic banking systems, machine operation systems, dispensing systems, human conveyance systems (e.g. Elevators, turnstiles, subways, trains and the like) and data access systems.

Upon receiving and authenticating an appropriate credential from the mobile device 12 using the credential module 36, or after receiving card data from lock card reader 90, the lock controller 24 commands the lock actuator 22 to lock or unlock a mechanical or electronic lock. The lock controller 24 and the lock actuator 22 may be parts of a single electronic or electromechanical lock unit, or may be components sold or installed separately.

The lock transceiver 28 is capable of transmitting and receiving data to and from at least the mobile device 12. The lock transceiver 28 may, for instance, be a near field communication (NFC), Bluetooth, or Wi-Fi transceiver, or another appropriate wireless transceiver. The lock antenna 26 is any antenna appropriate to the lock transceiver 28. The lock processor 30 and lock memory 32 are, respectively, data processing, and storage devices. The lock processor 30 may, for instance, be a microprocessor that can process instructions to validate card data and determine the access rights contained in the card data or to pass messages from a transceiver to a credential module 36 and to receive a response indication back from the credential module 36 with card data. The lock memory 32 may be RAM, EEPROM, or other storage medium where the lock processor 30 can read and write data including but not limited to lock configuration options and the lock audit trail. The lock audit trail may be a unified audit trail that includes events initiated by accessing the lock via the lock card reader 90 or the mobile device 12. The lock power supply 34 is a power source such as line power connection, a power scavenging system, or a battery that powers the lock controller 24. In other embodiments, the lock power supply 34 may only power the lock controller 24, with the lock actuator 22 powered primarily or entirely by another source, such as user work (e.g. turning a bolt).

The credential module 36 is in communication with the lock processor 30 and is operable to decrypt and validate a credential to extract virtual card data communicated into the lock controller 24 as a "virtual card read." That is, the access control 16a has essentially two readers, one reader 90 to read a physical key card 92 and the credential module 36 to communicate with the mobile device 12 via the lock processor 30 and the transceiver 28 and antenna 26.

While the figure shows the lock antenna 26 and the transceiver 28 connected to the processor 30, this is not to limit other embodiments that may have additional antenna 26 and transceiver 28 connected to the credential module 36 directly. The credential module 36 may contain a transceiver 28 and antenna 26 as part of the credential module. Or the credential module 36 may have a transceiver 28 and antenna 26 separately from the processor 30 which also has a separate transceiver 28 and antenna 26 of the same type or different. In some embodiments, the processor 30 may route communication received via transceiver 28 to the credential module 36. In other embodiments the credential module may communicate directly to the mobile device 12 through the transceiver 28. In other embodiments the credential module may be a software module whole executed within the processor 30.

The mobile device 12 generally includes a key antenna 40, a key transceiver 42, a key processor 44, a key memory 46, a GPS receiver 48, an input device 50, an output device 52, and a key power supply 54. The key transceiver 42 is a transceiver of a type corresponding to the lock transceiver 28, and the key antenna 40 is a corresponding antenna. In some embodiments, the key transceiver 42 and the key antenna 40 may also be used to communicate with the server 14. In other embodiments, one or more separate transceivers and antennas may be included to communicate with server 14. The key memory 46 is of a type to store a plurality of credentials locally on the mobile device 12. In other embodiments, the mobile device 12 communicates with the server 14 at the same time as it communicates to the access control 16a. This is the online configuration and in this embodiment a mobile credential is retrieved in real time and is passed to the credential module 36 without storing first in the key memory 46 on the mobile device 12.

Figure 3:
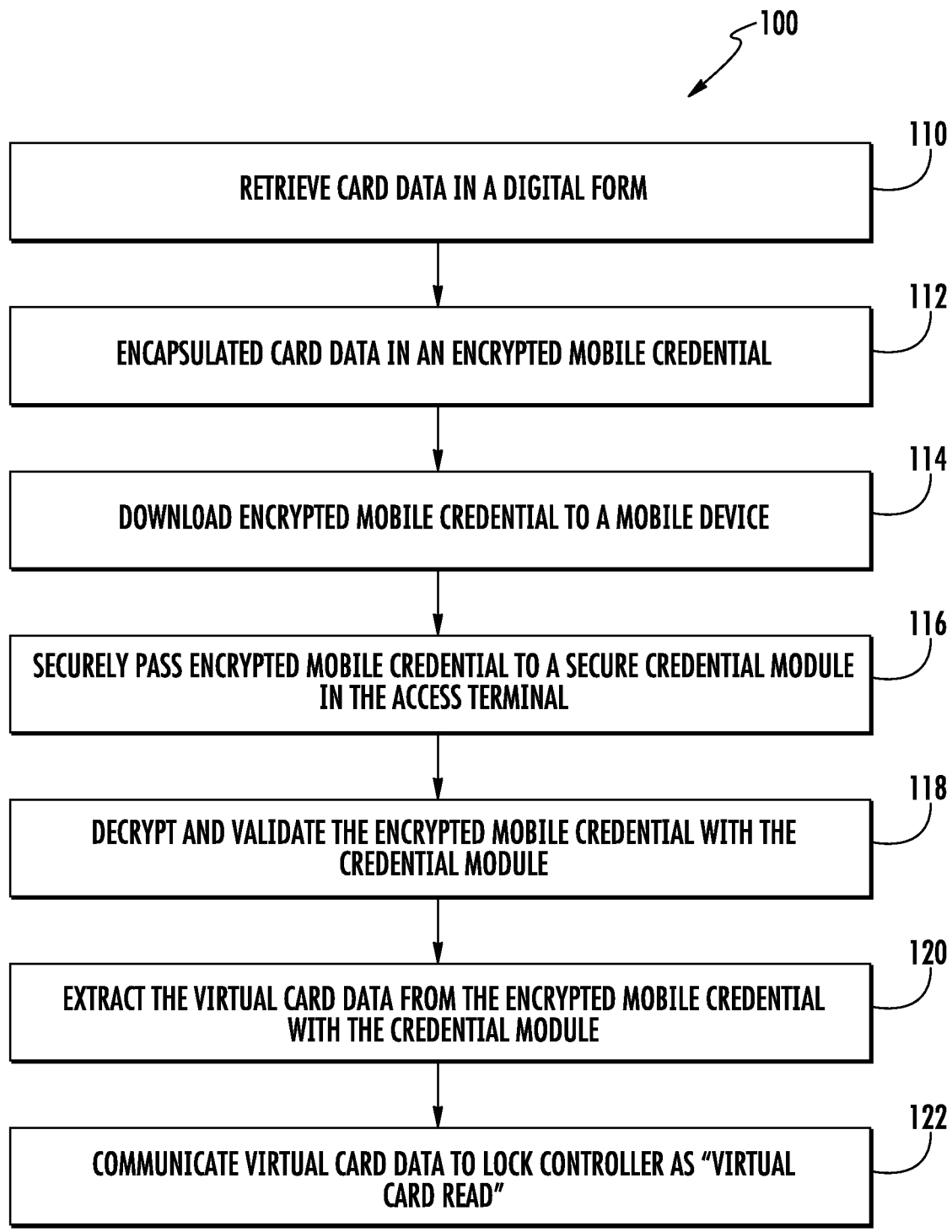
FIG. 3 is a flowchart of a credential management method performed by the user authentication system.

With reference to FIG. 3, a method 100 to facilitate communication of a credential representative of data that would normally be physically encoded on the key card 92 is retrieved in a digital form (step 110), encapsulated in an encrypted credential (step 112), downloaded to the mobile device 12 (step 114), securely passed to the credential module 36 (step 116) that decrypts and validates the credential (step 118), extracts the virtual card data (step 120), then passes the virtual card data into the lock controller 24 as a "virtual card read" (step 122). This, for example, permits a user to bypass a front desk of a hotel and go directly to their room as will be further described. The encrypted credential may be generated by the server 14 using well known techniques for digital certificate creation and encryption using cryptographic algorithms such as AES, ECC, RSA, and the like. For example, the credential may contain but is not limited to including a credential identifier, unique access control 16 identifier, unique credential module 36 identifier, an identifier shared with multiple access controls, a parameter indicating the type or format of the credential, it may contain encrypted data such as the virtual card data, and it may contain a digital signature. The encrypted data may be encrypted with an AES-128 encryption key that can be known to the credential module 36. Or it may be encrypted with a derived encryption key that can be determined from information contained in the credential. Further, the digital signature may be a CBC-MAC type signature based on an AES-128 encryption key, for example, that can be known by the credential module 36. Or, it could be a digital signature based on a private key known to the server 14 and can be validated by a public key known to the credential module 36.

Figure 4:
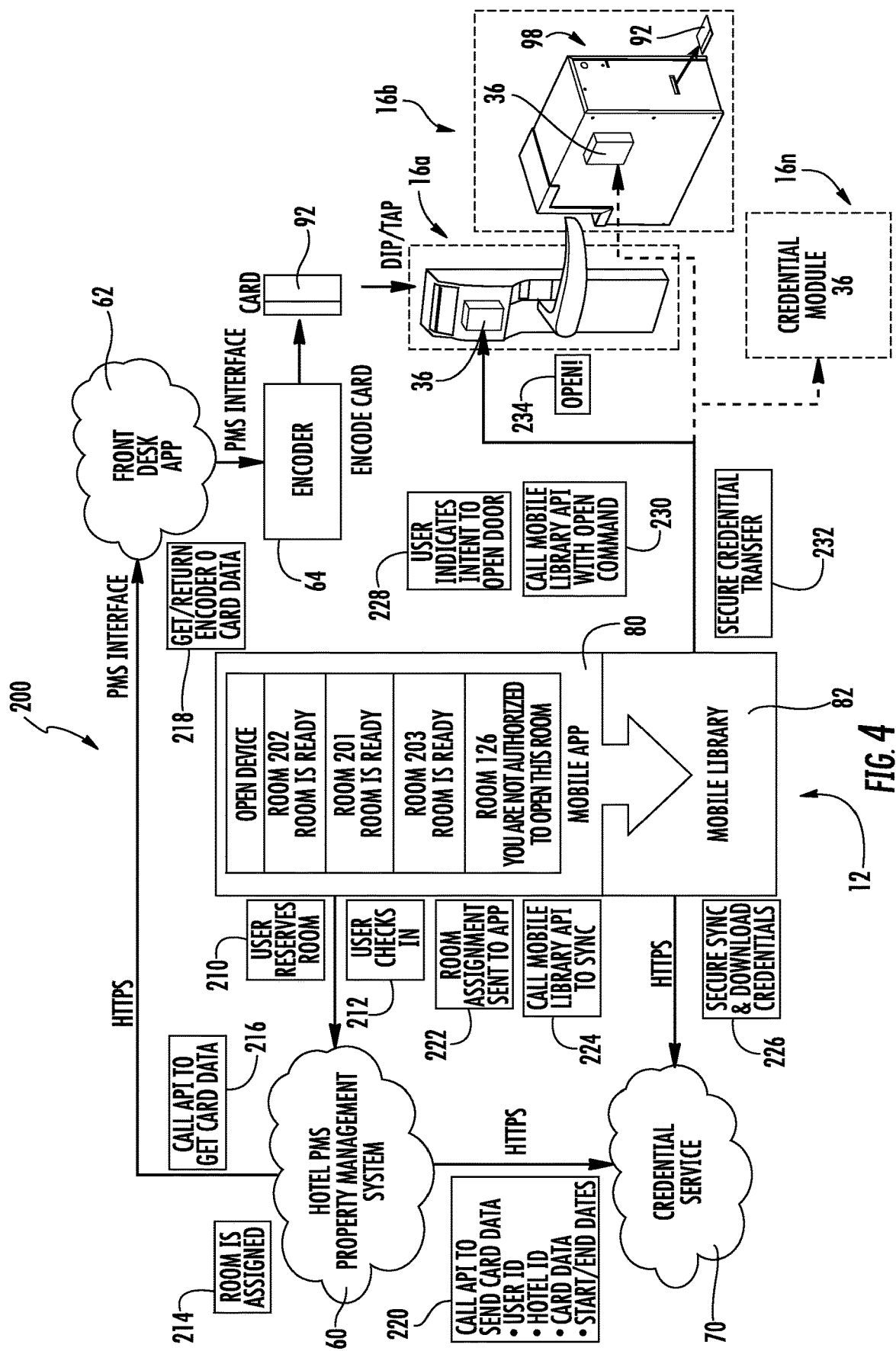
FIG. 4 is a flowchart of a credential management method performed by the user authentication system according to one disclosed non-limiting embodiment.

With reference to FIG. 4, one example bypass the front desk method 200, is initiated by a user who first reserves a hotel room (step 210) through any process supported by a hotel, such as mobile reservations, web sites, travel agents, etc. Later, a check-in procedure confirms their stay (step 212). Again, this can be performed through any process supported by the hotel.

Next, a room is assigned in a hotel property management system 60 based on the guest preferences (or room selection) and the room availability on check-in (step 214). The hotel property management system 60 may use a software-to-software application programming interface (API) provided by a front desk application 62 to request card data in a digital form (step 216). The front desk application 62 may range from a stand-alone encoder 64 to a complete software package running in a cloud that is operable to encode a virtual card for the room that was selected and return the virtual card data back to the hotel system (step 218).

Next, the hotel property management system 60 will make another software-to-software API call to a credential service 70 after the hotel system has authenticated the user and has allocated a room stay reservation (step 220). The pertinent information is communicated to the credential service 70 with an indication to include, for example, what hotel property, what room, what guest (e.g. User ID), what dates and also the virtual card data for the stay.

Simultaneous, or in sequence with sending the virtual card data to the credential service 70, the hotel property management service 60 communicates an indication to the user (again, through any conventional method) that the check-in is confirmed and the room is assigned (step 222).

Next, a mobile device 12 based hotel loyalty mobile application 80 will utilize a software-to-software API in a mobile library 82 (step 224) to download credentials from the credential service 70 (step 226). The mobile library 82 will securely authenticate to the credential service 70 with a prior established shared secret that may change on every successful connection.

Once authenticated, the credential service 70 generates at the time of the communication from the mobile library 82 the credentials for the user and encrypts into the credentials the virtual card data received in step 220 for the guest associated with this instance of the mobile library. One credential is generated for each door or access point and the virtual card data will be the same in each of these separate credentials, but may be encrypted with a unique key for the particular door or access point. The method of encryption may be AES, 3DES, or other such encryption method. The method and type of credential used may be a compressed digital certificate or a standard based certificate like X.509 or other certificate format known to the art. That is, for example, the virtual card data is encrypted into the credential with a unique key known by the credential module 36 and know or determinable by the credential service 70.

The mobile library 82 will download and store the list of credentials on the mobile device 12 using native OS protections and additional encryption of data with device specific information, e.g., UDID, IMEI, IMSI, MAC addresses, etc. Now that the check-in is complete and the encrypted mobile credential (with virtual card data) is resident on the mobile device 12 (FIG. 2), the user can operate the access control 16 in an offline mode at any later time without the mobile device 12 being required to be connected to the credential service 70. Additional embodiments may have the mobile device 12 download a credential at the same time mobile device is communicating to access control 16 at the same time the user wishes to access their room, for example.

When the user wishes to access their room (step 228), the user may indicate such intent through a gesture, a click of a button, a tap on the screen, a finger print read, password, proximity to the lock, touching the lock, etc. In response to this intent, the hotel loyalty mobile application 80 again calls the software-to-software API in the mobile library 82 to initiate the secure transfer of the encrypted mobile credential to the access control 16 (step 230). While the loyalty application 80 initiates the transfer, the mobile library implements the secure transfer separately in the next step.

Secure transfer of the credential (step 232) may start with a process of the mobile library 82 listening for a signal advertisement such as Bluetooth low energy (BTLE) advertisements from in-range access controls 16. That is, the access controls 16 are advertising their presence on a periodic rate with advertisement data that indicates an identifier of the access control 16 and the mobile device 12 can listen and connect automatically without the person having to push a button to wake-up a sleeping, battery powered lock 16 or to get out of a vehicle to interact with a reader access point on a garage door or other device. The reader access point is another type of lock 16. Another embodiment is to use Near Field Communication (NFC) and the person 'taps' their mobile device to the lock 16 and a secure credential exchange transfers the mobile credential to the access control 16 (step 232). Secure credential exchanges can be done using standard techniques such as establishing a session key, encrypting communication messages, and validating the authenticity of message sender and receiver.

In the preferred embodiment where the access control advertises using Bluetooth low energy (BTLE), the mobile library 82 filters the received advertisements based on, for example, the received identifier of the access control 16 and by comparing with identifiers contained in or associated with each credential in the list of mobile credentials and based on the user intent to access a particular room. The comparison could be based on a unique identifier for an access control 16 or based upon a shared identifier where a group of access controls share a common identifier. In some cases an access control 16 may advertise both a unique and a shared identifier and the mobile library 82 can filter based on both. Once an advertisement is received for a target access control 16, the mobile library 82 initiates a wireless connection, and performs a secure transfer of the encrypted mobile credential (step 232). The secure transfer may utilize a unique session encryption key and standard cryptographic algorithms and techniques. It should be appreciated that the data can be securely transmitted over any wireless link, to include but not be limited to BTLE, zigbee, Near Field Communication, etc.

The credential module 36 will receive the encrypted mobile credential, then validate and decrypt the encrypted mobile credential to retrieve the virtual card data. The decryption and validation may include, but not be limited to, validating a digital signature, validating the type of the credential, validating that the credential identifier matches an identifier in the lock memory 32, validating a starting date and an expiring date of the credential, validating the source of the credential, etc. (step 118; FIG. 3). Once validated and decrypted, the virtual card data is extracted (step 120; FIG. 3).

The virtual card data is then communicated via hardware and software interfaces, depending on embodiments, to the lock controller 24 which may further decrypt the virtual card data, processes the data based on lock vendor rules, then open the lock if entry is permitted (step 234). Notably, the virtual card data is communicated into the lock controller 24 as a "virtual card read" in a data format equivalent to that of a physical key card. This thus permits the continued usage of traditional guest key cards 92 such as that of a family member, or a guest that just wants a copy of the physical key card 92, along with usage of the mobile device 12.

The audit trail uploaded by the mobile device 12 can be just the audits generated by the mobile device 12 itself, or can be the unified audits including openings by the guest using a physical key card. In addition, when the lock 16 is opened, a battery status or other maintenance information thereof may be uploaded into the audit trail from the mobile device 12 to the credential service 70 so that the hotel can be notified of low battery conditions and proactively change the batteries, or perform other maintenance. Other information associated with the audit trail can include, for example, failed openings or failed attempts or credentials that failed validation.

Usage of the "virtual card read" maintains a contiguous audit trail and also maintains all the known use cases for access control that are already encoded into traditional card data. Furthermore, the credential module 36 is lock vendor agnostic, so that any lock vendor's data could be passed through to allow each lock vendor to independently innovate card data. Further, the credential module 36 may be supplied by a different company than the lock 16. And also, the server 14, mobile device 12, and credential module 36 may have no means for further decrypting or validating the card data other than treating it like a data object to be encoded, encrypted, transferred, retrieved and delivered. Additionally, the "virtual card read" can be used offline without requiring the mobile device 12 to be online with a Wi-Fi connection or real time connection to a credential service. That is, the data for the "virtual card read" is stored on the mobile device 12 and passed securely to the credential module 36 in an offline mode. This is not to limit the capability to also send the "virtual card read" in an online mode. An additional benefit is that any access controls 16 can use any card types in addition to using a credential module 36, where the card types include but are not be limited to, Magnetic strip, RFID, Proximity, etc.

In another disclosed non-limiting embodiment, the credential module 36 can be used for many purposes, to include, but not be limited to, passing data to a self-service hard-key dispenser unit 98 that produces physical key cards 92. The hard-key dispenser unit 98 has a credential module 36 that receives the virtual card data, decrypts, extracts and sends to a lock controller 24 configured to encode the data onto a physical key card 92. That is, the virtual card data on the mobile device 12 is written to a physical key card 92 by the unit 98 and dispenses the key card 92 in an automated manner. The unit 98 does not require any user interface besides the dispensing element for the key card 92 and a unit power source, including but not limited to batteries, mains power, energy harvesting, and the like. The user interface for the unit 98 is really the interface of the mobile device 12. When the unit 98 begins to run low on blank key cards 92, the mobile device 12 can upload to the credential server 70 an indication of the status that can be turned into a report to notify the hotel that the unit 98 needs to be refilled.

In other disclosed non-limiting embodiments, the virtual card data can be standard access control card data (i.e. identification data) for badge access systems, or integrated into a vending machine with the virtual card data as credit card information, tokens, purchase reference identifiers, or the like.

Figure 5:
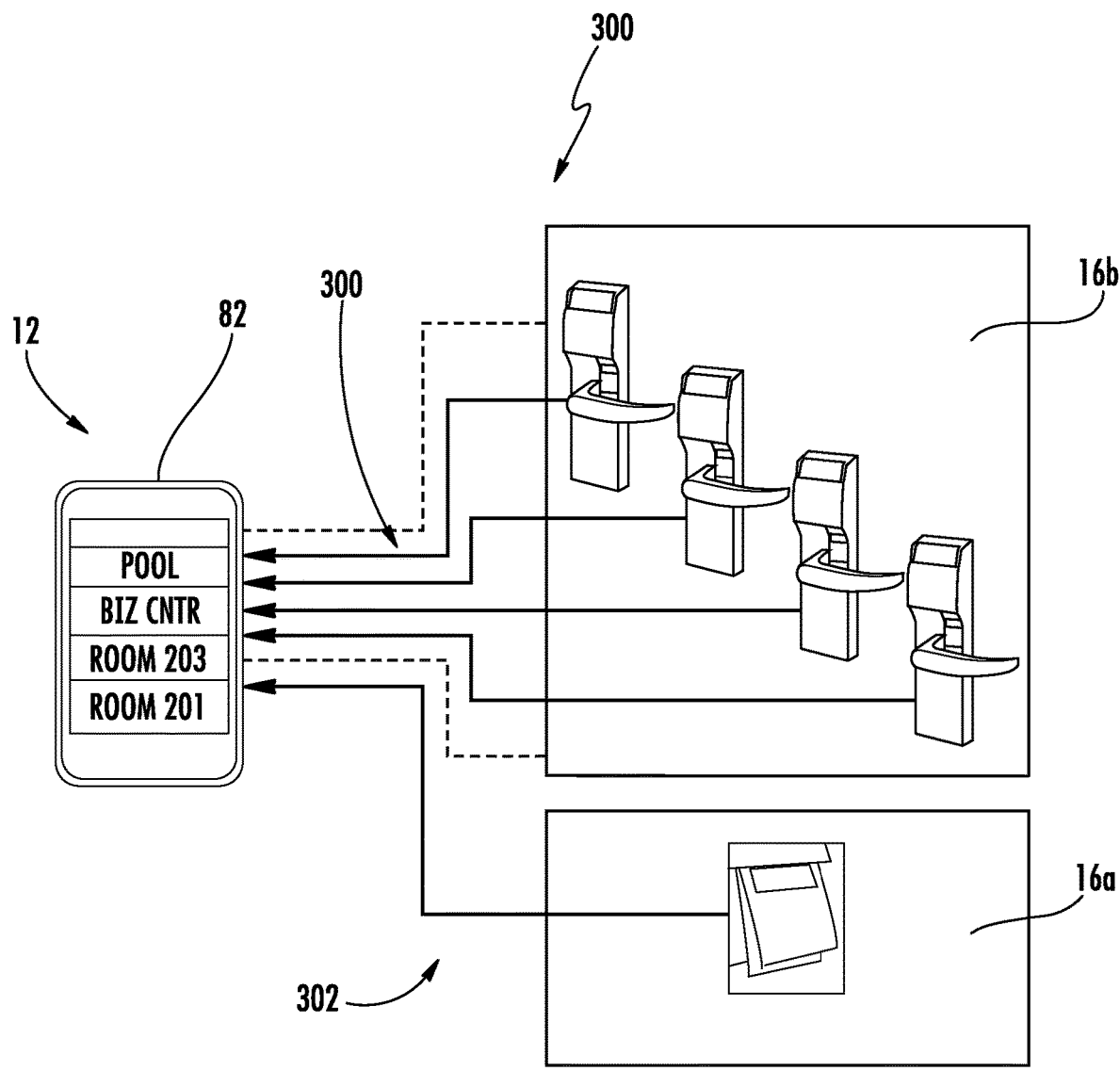
FIG. 5 is a schematic view of a credential according to another disclosed non-limiting embodiment.

With reference to FIG. 5, the mobile library 82 may include a set of mobile credentials that were generated by the credential service 70 based on access categories 300 (implicit permission) in addition to the mobile credential with virtual card data (explicit permission) 302 that was generated by the credential service 70 for a specific access control 16a. The access categories 300 operate to grant the user access to a particular grouping of access controls 16b that have collective meaning. For example, one access category could be 'Public Rooms' for access to a pool, business center, elevator, and wall readers. In the context of a hotel reservation, when the mobile device 12 communicates with the credential service 70 to download the encrypted mobile credential, the credential service 70 generates credentials for each lock in one or more access categories that the guest has been granted access. The encrypted mobile credential will thus have the same virtual card data encoded specifically for each specified access point, e.g., pool, business center, etc. and may optionally have the access category downloaded in or with the credential. However each mobile credential will be encrypted separately with a unique key for each access control 16b.

Provision and use of the access category 300 by the credential service 70 facilitates the efficient management of multiple access controls 16b in a system where the mobile device 12 can open multiples of locks where the mobile device 12 has a specific credential for each lock. This is simpler when compared to that which is conventionally required, e.g., two access control systems—one for the hotel system that generates the virtual card data with all the current art for hotel system access business rules, and a second one for granting access with a mobile credential to each access point, e.g., guest room, wall readers, pool, business lounge, etc. In other words, the business rules for the hotel system would need to be duplicated in the credential service.

The access category 300 allows for multi-vendor integration and can work separately from the hotel system access business rules that get encoded into virtual card data. The mobile credentials are thus an additional 'layer' of security "on top" of the virtual card data. The access category 300 also allows for relatively more simple maintenance procedures, such as, for example, when a lock in the 'Public' Access Category is replaced, the replacement lock need only be assigned to the same access category. However, a mobile device 12 would still need to communicate again to the credential service 70 for a new set of mobile credentials to be downloaded. No further administration is required on the part of the guest or system besides including the replacement lock in the correct access category and all guest permissions will continue to work seamlessly without modification even though the new lock has unique encryption keys from the prior lock.

Figure 6:
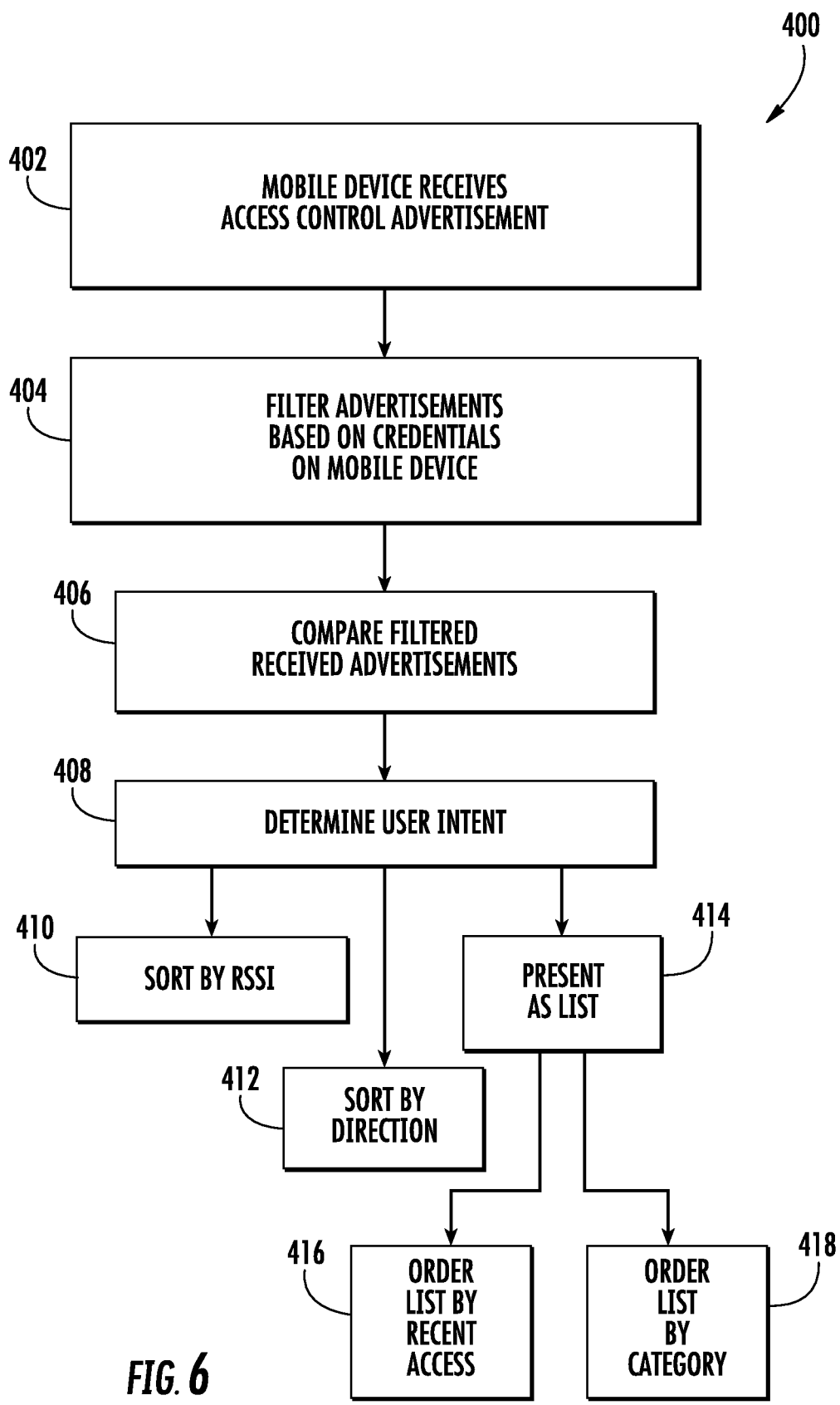
FIG. 6 is a flowchart of a advertisement filtering method according to one disclosed non-limiting embodiment.

With reference to FIG. 6, in another disclosed non-limiting embodiment, a method 400 of advertisement filtering may be initiated to capture the user intent when presented with multiple accessed controls 16. Initially, each access control 16 advertises using Bluetooth low energy (BTLE) which is received by the mobile device 12 (step 402). Advertisements from multiple access controls 16 can be received if they are all in proximity to the mobile device 12 or they are transmitting at a high enough power that they are within a distance from the mobile device 12 to be received.

Next, the mobile library 82 filters the received advertisements based on the downloaded set of credentials (step 404). That is, the received advertisements not associated with the set of credentials downloaded to the mobile device 12 are filtered out. In this way, any access controls 16 that the user is not permitted access rights are not even provided in a selection list or in the reduced set of possible locks to open. This filtering can be done based on an identifier contained in the access control 16 advertisement message and matching this identifier against an identifier contained in or associated with a credential stored in mobile device 12.

The mobile library 82 on the mobile device 12 then compares the identifiers contained in, or associated with, each credential in the filtered list of mobile credentials to determine the user intent to access a particular access control (step 406). Typically, only the user's room will remain within range once the filter is performed such that the user's intent is determined (step 408).

Alternatively, or in addition, if the filtered set of credentials still has more than one lock within range, then the filtered set of credentials may be sorted by RSSI (received signal strength indicator) or by an average of the RSSI (step 410). Sometimes the RSSI for a single advertisement may not be accurate due to radio frequency propagation characteristics (e.g. multi-path, interference, etc.) so an averaging function of more than 1 advertisement may be used to reduce the probability of error on a single reading to facilitate, for example, an averaging of the RSSI in addition to a single reading of the RSSI. The access control with the highest signal strength is thus presumably closest to the person, and thus the user's intent. Further, if the mobile device 12 is utilizing a locating system such as GPS where the precise location of the mobile device relative to access control 16 is known, then the location and distance to the access control can be used to determine the nearest access control 16.

Alternatively, or in addition, the mobile device 12 may include a directional capability, e.g., compass and/or triangulation on a Bluetooth signal. For example, the mobile device 12 may include multiple Bluetooth antennas and the capability to determine the direction of the BTLE advertisement relative to the direction of the mobile device 12 using known methods in the art of wireless communications and antennas, or based on a separate locating system where the precise location of the mobile device relative to access controls 16 is known, the compass can be used to determine which of the access controls 16 the mobile device 12 is pointed at.

Thus, if the filtered set of credentials still has more than one lock within range, a user will typically point the mobile device 12 at the lock they intend to open and thus the direction can be utilized to further sort the filtered set of credentials (step 412) and determine the access control associated with the user's intent.

Alternatively, or in addition, the filtered set of credentials may be presented to the user as a list, e.g., ROOM 1125, ROOM 1127, Concierge Lounge, Elevator, etc., (step 414). The user may thus select the desired access control to open from the list. The list may be ordered in various ways, to include, the last access control opened such that, for example, the user's room will likely be at the top of the list after an initial access (416). The user can select from the list by tapping on the screen, or by responding with 'yes' or 'no' to voice prompts reading the rooms, or by a voice recognition algorithm that matches their vocal request against the filtered list of available rooms. Alternatively, or in addition, they could also use gestures to scroll through the list and select the desired room. The gesture would indicate to the mobile device 12 which direction to scroll the list and a separate gesture could be used to then indicate the selection, e.g. rotating the phone side-side, a quick acceleration or other gesture. The benefit of voice prompts or gesturing over tapping is that these operations can be done with one hand, e.g. tipping the device away would scroll the list down and tipping the device towards would scroll the list up, or other such gestures. In a case when a user has, for example, multiple concurrent hotel room reservations that provide access to the same access category and set of doors concurrently with multiple reservations, i.e., pool, side doors, etc., the confirmation number or other reference may also be included in the credential. So, with multiple credentials for the same lock, the user's 'stay' or 'confirmation number' may be used to also filter the list.

Alternatively, or in addition, the list may be selectively ordered by 'category', i.e., 'open my guest room'- and if the user only has one guest room, then filter out other locks that are not of this category, even though they are within range and permitted to open (step 418). For example, this may be performed by selecting a category icon on the mobile device 12, or by selection of pre-set preferences, e.g. "Public Door" to avoid inadvertently opening the room door along with a public access point because both are within Bluetooth range.

Figure 7:
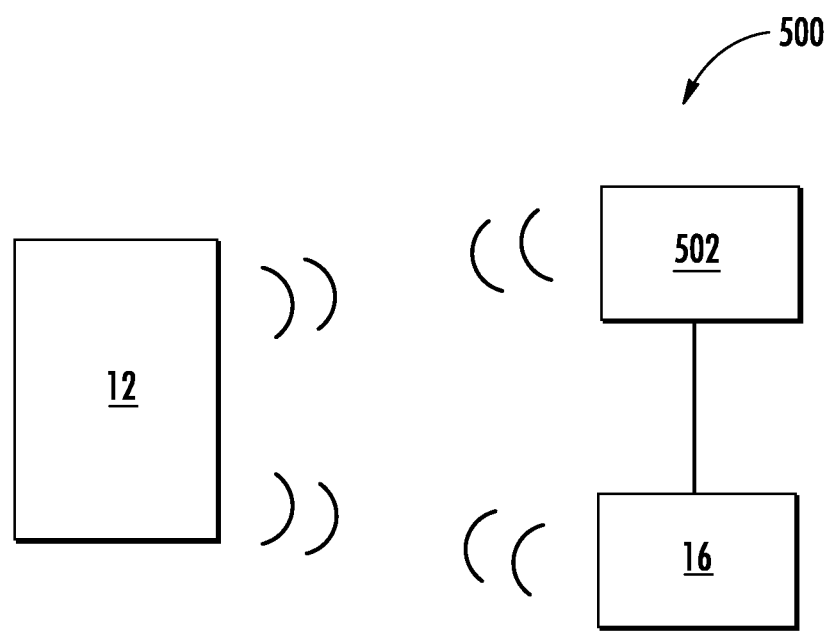
FIG. 7 is a schematic view of a filtering method according to another disclosed non-limiting embodiment.

With reference to FIG. 7, alternatively, or in addition, a secondary interface 500 may be utilized to provide additional information to the mobile device 12 to facilitate identification of the access control 16. In one example, an NFC (Near Field Communication) tag 502 may be associated with the access control 16 such that reading the NFC tag facilitates indication of which access control to communicate with over Bluetooth low energy (BTLE). As Bluetooth low energy (BTLE) has a relatively long range and may bounce in various manners, such a secondary interface facilitates proper proximity selection. A NFC tag, for example, could be affixed relative to the access control 16 so that by 'tapping' their mobile device 12 to the lock, it reads the credential identifier from the tag that is therefore associated with a specific access control 16. It should be appreciated that other information may alternatively or additionally be utilized such as image recognition of room numbers using a camera on the mobile device, altitude to determine which floor the mobile device 12 is on, etc. It should be appreciated other secondary interfaces 500 such as iBeacon, a barcode, or QR code printed on the lock that can be read by the mobile device 12 camera to determine an identifier associated with access control 16.

Advertisement filtering facilitates interaction between the user and the access control 16 as there is no need to 'turn the lock on.' Additionally, there is a benefit that the user can interact at a distance from a lock. An example is a parking garage locking point where traditionally a user had to open a window or exit a vehicle to use a card on a reader terminal to open the gate.

Figure 8:
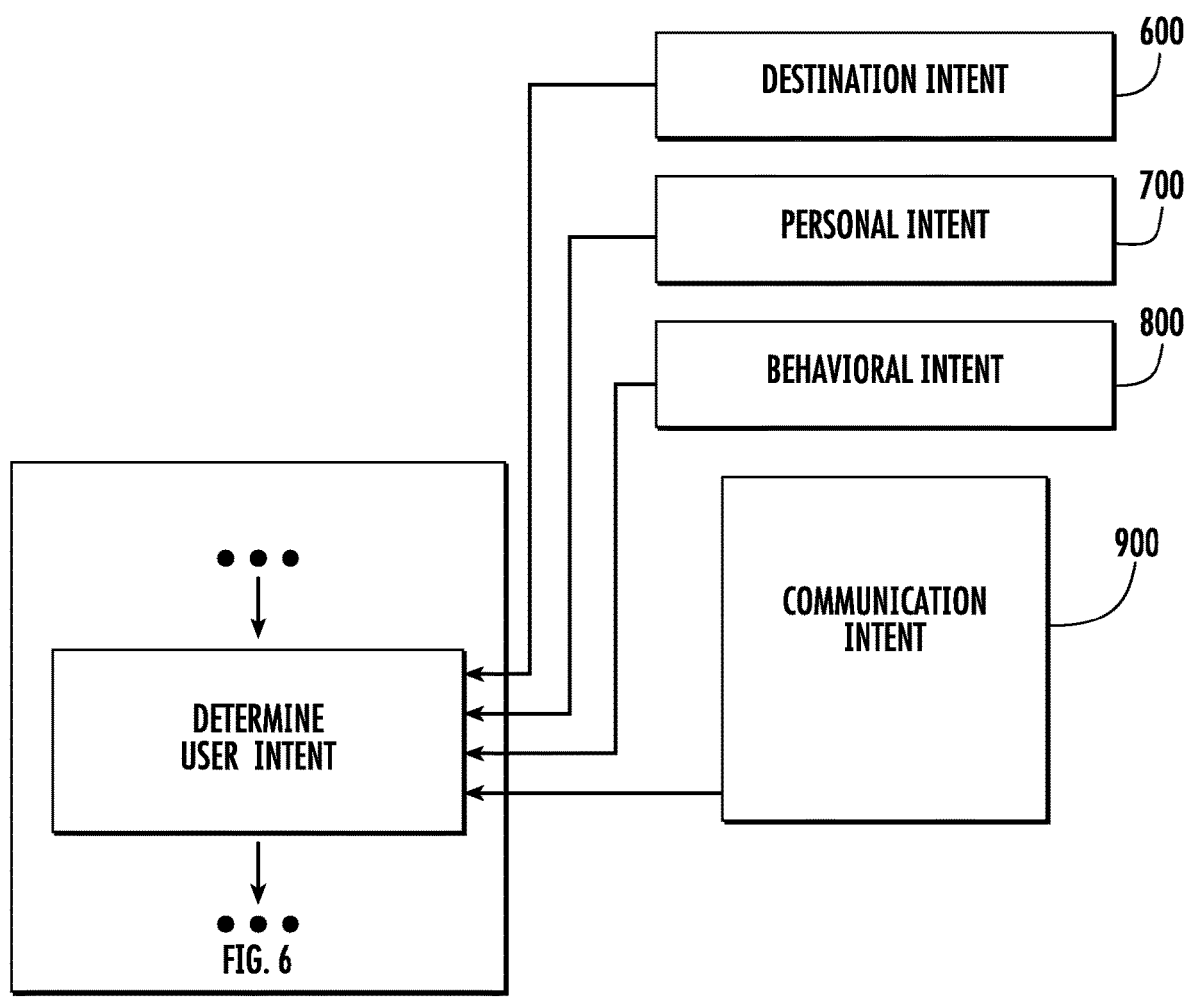
FIG. 8 is a schematic view of a filtering method according to another disclosed non-limiting embodiment.

With reference to FIG. 8, alternatively, or in addition, destination intent 600 may be utilized to provide additional information to the mobile device 12 to facilitate identification of a desired access control 16 for the anticipation of user intent. In one example, the anticipation of user intent may be utilized so that intermediate doors may be opened on route due to proximity/routing with the mobile device 12. In this example, the mobile device 12 may guide the user to a particular elevator/door for routing around high congestion areas. High congestion areas may be determined by other mobile device 12 carried by other people who are using the same app or another app that indicates the presence of people and can communicate this to the first mobile device 12 to indicate areas of congestion. Alternatively the location of people and adjustment of route may be done by the credential service 70. The destination and/or congested route may also be adjusted based on, for example, the time of day and the schedule of the user. The destination could be manually selected by the user of the mobile device 12 by selecting a particular destination access control 16 from a list of access controls. Or, they may select a location that is associated with an access control 16. The association may be through various means, such as direct association or association by proximity (i.e. they are in the same location). Further, the destination could be selected automatically based on the users schedule, time of day, etc., as accessed on another app of the user's device such as an Outlook calendar. A route can be determined by various known methods for optimized routing algorithms or indoor routing algorithms and by defined "way points" that are the actual access points 16 along the route. As the person moves along the route, the mobile device 12 automatically opens the access points 16 that are part of the route as they come within range of the mobile device 12.

In another example, the destination may be created by the system 10 or may be created outside the system 10. This can happen when, for example, the Hotel property management system 60 sends a destination into the credential service 70. In this example the property management system 60 is outside the system 10. Another example of this would be a vehicle sharing program and the Vehicle system sends a destination into the credential service 70 where the destination is the location of a vehicle to be shared. The vehicle itself may be an access control 16 to be opened upon arriving at the destination. Further, the ignition of the vehicle may be an access control 16 that when actuated starts the vehicle. The vehicle itself is a type of destination. Another example could be a vacation rental property or other asset protected with an access control 16 where the user's destination results in a permission granted to the credential service 70 for the access control 16 at the destination.

In another example, ordered groceries, maids, personal assistants, Real Estate showing, etc., may be provided access at a given time of day when in proximity to a particular access control 16 where their destination is a scheduled event to provide a service at a location. In another example, intent can be delegated from one person to another where a first person signals intent to open a door for a second person. The delegated intent may be made, for example, by giving a destination to the second person or by scheduling for another person a service at a location with a given destination. In this case an access point 16 may be associated with the destination or with the location of the destination. Alternatively, or in addition, a work-order on the mobile device 12 may be required to anticipate user intent in combination with the associated particular access control 16. That is, the work order and the proximity are required to for the anticipation of user intent and the access point 16 may be associated with the work-order, or the location of the work-order destination. The work-order may be sent via email, or by other medium that provides particular authorization. Further, the mobile device 12 may require selection of the work order to further signal intent so that when the work order is not selected or active on the mobile device 12, then user intent is not being signaled.

Further to the examples above, the destination may be selected as a pre-determined objective of a user, where the objective is to do something, like 'find the enemy' or 'get something' where the objective may also not be stationary. The objective is not a place, it's something to be done. To generalize, the objective would by inference specify a destination that by inference would specify a specific access control 16 or set of access controls 16 along a route to the destination and the destination or route may dynamically change as the focal point of the objective moves around.

In another example, while navigating to an intended destination 600 the mobile device 12 may provide way finding such as via a camera thereof to provide a direction to a particular access control 16. That is, the camera may be utilized to display the surroundings over which directions or other instructions or visual queues such as a 'glowing' box or arrows or lines are overlaid to reach the particular access control 16. In the course of viewing the screen of the mobile device 12 a person may signal intent by tapping on the screen and indicating via visual intent the access control 16 that they desire to open. The virtual augmentation would rely upon known technologies for indoor locationing, indoor mapping, outdoor locationing, outdoor mapping, and directionality indicators like GPS, magnetic compass, and accelerometers. Applications like this exist in the art for star gazing, for way finding and personal navigation with a mobile device 12. The access control 16 would be defined as a waypoint or interactive virtual device within the personal navigation system and when selected could trigger the action and intent to open a door.

In another example, the mobile device 12 may have a find this location feature wherein the location could be a GPS location, address, event, or venue and the user is guided through various access controls 16 to get to that location and upon arrival at that particular GPS location the nearby access control 16 is accessed.

In another example, the mobile device 12 may provide guidance to friends and family and the mobile device 12 will open any particular access controls 16 along such a path. That is, the particular access controls 16 through which the user must pass to reach friends and family, e.g., "find my friends" may be identified and selectively opened along a route to get to where they are. The route could be determined in a similar fashion as described in examples above. The user intent is automatically determined for these access controls 16 because of the location of friends and family. The friends and family may have similar mobile device 12 or some other method of locating their current location.

Alternatively, or in addition, a list of friends is provided on the mobile device 12. Selection of a particular friend or person is then utilized to guide the user through various access controls 16 to automatically guide the user to the selected family or friend. Alternatively, the guiding to selected family or friends could include determining the current location of the friend. Alternatively, a location at which friends are to meet could be determined. Alternatively, a fixed location at which a friend is known to reside can be included. Further, the "friend" may be determined via an interaction with a social media account where the mobile device 12 uses information from a social media account or system to determine which access control 16 to open. Further, a "friend" may choose to publish their location to other friends, thus providing a destination that can be used to signal intent.

Alternatively, or in addition, the destination intent 600 can be based on the ambient pressure exerted on the mobile device 12. This includes pressure from gravity, barometric, and underwater pressure. For example, the access control 16 is located deep underwater, the user would use their mobile device 12 to detect the underwater pressure and when the user was nearby the access control 12 and at a certain depth this may signify user intent to enter the door. If the pressure has not reached a certain level then user intent has not yet been signaled.

Alternatively, or in addition, the destination intent can be based on the ambient temperature detected on the mobile device 12. For example, the access control 16 is located within a nuclear reactor near a coolant pool, the user would use their mobile device 12 to select the correct access control 16 based on the RSSI and nearby heat of the water in relation to the reactor core. Another example, would be in a building and the fire fighter can select the access control 16 because of the RSSI and the heat of the room that indicates where the fire is located. In some embodiments the mobile device 12 determines the ambient temperature itself, in another embodiment the ambient temperature may be communicated to the mobile device 12 as a communication intent 900 combined with a destination intent 600 from some other sensor that is in the room, in the water, or measuring some heat source. Again, in the example of the fire above, the destination may be determined by the fire alarm system that knows which room is the hottest and routes the firemen through the access controls 16 to the location of the fire.

Alternatively, or in addition, the RSSI may be combined with an audible alarm received on the mobile device 12. For example, several access control 16 is located in a room and a fire alarm is alerted over one of the doors, the user would use their mobile device 12 to select the correct access control 16 based on the RSSI and the audible alarm set off by the fire. In this example, when the audio signal reaches a certain DB level, this may signal intent to open the access control 16. Alternatively, the annunciation of an audible alarm may signal to a system, for example an Intrusion Alarm Panel, that the system has been breached and the destination may be determined automatically based on the location of the breach or the location of the audible alarm and then communicated with a communication intent 900 to the mobile device 12 by the intrusion system. This would be useful in the case of, for example, rapid response or police. Further, in another example, the user intent may only be signaled if there is an audible alarm and without the alarm the user intent is not signaled. This may be useful for rapid response where they have no need to go through an access control or even no authorization for an access control unless an alarm is sounding.

Alternatively, or in addition, the destination intent 600 would be based on audio captured by the mobile device 12. For example, the user wants to listen to their favorite band and based on the audible sound of music captured intent is provided by getting closer to the sound of the band located behind the access control 16 device.

Alternatively, or in addition, the destination intent 600 would be based on the voices heard on the mobile device 12. For example, the user wants to be able to find someone but the mobile app only knows the voice signature of the selected person. As the user moves closer to the person's voice, the destination is derived based on the closer to the voice of the selected person. In some embodiments the voice signal is detected directly by the mobile device 12, however in other embodiments the voice signal may be detected by a surveillance camera or other equipment and communicated to the mobile device 12 and the destination is determined by the proximal location of the surveillance equipment to the person with the voice.

Alternatively, or in addition, the destination intent 600 would be based on an image captured on the mobile device 12. For example, the user is parking in an access controlled parking garage, and after parking the user uses the mobile device 12 to take a picture of their car in the parking spot. When the user attempts to return to their parking spot the destination intent 600 is based on the image captured on the mobile device 12. For example, by selecting the image and indicating an intent to go to the place the image was taken will implicitly grant user intent to open access controls 16 on the route to the location where the car, in this example, was parked. Alternatively, the image could be used to communicate with a system that can identify objects from the image and determine the current location of those objects in the real world and then provide a route include implicit user intent to open access controls 16 along this route to go to the real location of the object.

Alternatively, or in addition, the destination intent 600 would be based on video captured on the mobile device. For example, the user records a video and later in selecting this video they implicitly are selecting the location where the video was taken and by signaling a desire to go to where the video was taken they are giving implicit intent to open any access controls 16 along the route or at the location the video was taken. Further, similar to the examples above, an object from the video could be used to identify the current location of this object (if it is movable) and signal a desire to go to that current location and access any access controls 16 along the route to the new location.

Alternatively, or in addition, the destination intent may be signaled based upon arriving at a location determined by cell network signal strength or by Wi-Fi signal strength or simply a particular Wi-Fi access point. The signal strength can be used by the mobile device 12 to determine if it has arrived at a location or where it is relative to a destination. In this case the destination would be mapped to a particular cell network signal strength or triangulated location based on several cell towers. In addition, the Wi-Fi access point identifier could be used more generally so that when within range of this particular Wi-Fi device (i.e. a particular SSID or MAC address) then the destination has been reached. Further, if the mobile device 12 is near a given Wi-Fi network this may signal user intent because of proximity to that particular Wi-Fi network. When out of range, then the user intent is not signaled because they are no longer in proximity of the access control 16 that they normally interact with. An alternative to Wi-Fi and cell signal is an iBeacon based upon Bluetooth® where when the mobile device 12 detects a particular Bluetooth advertiser by inference knows it has arrived at a particular location and at that location will automatically have destination intent to open the access control 16 at that location.

Alternatively, or in addition, direct personal intent 700 may be utilized to provide additional information to the mobile device 12 to capture user intent and thereby facilitate identification of the particular access control 16. For example, a received signal strength indication (RSSI) may be used to start an access process, e.g., the user is within 1 foot of the particular access control 16. The access process may begin at a first distance where the mobile device 12 can hear the advertisement from an access control 16 and filters the set of possible credentials (step 404, FIG. 6) and then when the mobile device 12 is moved closer within a second distance this would indicate intent (step 408, FIG. 6) to open the access control 16. The first distance may be 30 feet and the second distance may be 3 feet, for example. Alternatively, the access process may also include another intermediate distance that is between the first distance where filtering starts to happen and the second distance where intent is signaled. At this intermediate distance the mobile device 12 may start to automatically communicate with access control 16 in anticipation that intent will be signaled soon. In this case, when intent is signaled, the process of opening access control 16 has already been started and can be completed quickly giving the impression of a faster 'time to open'. In another example, the duration at which the mobile device 12 is held within a second distance may indicate intent to open and so if the duration is less than a time threshold (e.g. 1 second), then the access control 16 would not be opened, but if the duration is longer than a threshold, then the intent would be signaled. The RSSI may be combined with gestures such as twisting the mobile device 12 to further capture user intent. In this case, a gesture would not trigger an access control 16 to open unless the RSSI was within a certain level (i.e. within a second distance). Alternatively the RSSI may be combined with the amount of time that the mobile device 12 is held in proximity or within a distance to an access control 16. Alternatively, an accelerometer in the mobile device 12 may be used to determine user intent, e.g., if the mobile device 12 is still moving, don't open the door but if it is stopped or not moving within a distance of the desired access control 16—open it.

In another example, the access control 16 is selected based on a visual map that may be displayed on the mobile device 12 or may be on a display or a wall hanging where the map is interactive. A representation of the access control 16 is on the map and when the user intends to open an access control 16 they tap on it. A representation of the access control could include text, a picture, an icon, something associated with the access control 16 (e.g. a door or a gate) or it may be some other visual indicator typically shown on maps. The user may be in proximity at the time of selection of the map that would provide immediate intent. Or, the user may provide a delayed intent and the access control 16 will open as soon as they come within range. Or they may provide a delegated intent and signal for someone else an intent to open an access control when the other person's mobile device 12 is within range of the selected access control. The delegated intent could be sent from one mobile device 12 to another mobile device 12, for example, by SMS, by email, or through the credential service 14. If the map is, for example, external from the mobile device 12, the map may have capability to communicate with the mobile device by sending a Bluetooth message to the mobile device 12. Further, the user may signal personal intent by using their mobile device 12 to read a NFC tag on the map at the location of the visual indicator. Or, the user may signal intent by using their mobile device 12 to read a QR code next to the visual indicator.

In another example, the mobile device 12 may use biometric recognition or tracking to infer intent to operate the access control 16. In this example, eye tracking may be utilized to capture user intent, e.g., looking at an access control 16 and blinking will signal intent to unlock. In this embodiment the mobile device 12 may include a wearable component like smart glasses or the like that has the capability to track eye movement. Similar to embodiments above, this may utilize known algorithms for tracking augmented reality and identifying an object which would be mapped to an access control 16.

In another example, haptic feedback may be utilized to determine user intent. The mobile device 12 may buzz or vibrate or make a sound when in proximity to the accessible access control 16. Then, a gesture may be utilized to open the access control, e.g., tap on the case of the mobile device 12 to open. The accelerometer in the mobile device 12 can differentiate a tap from other motion of the device. Alternatively, rather than the mobile device 12, a device connected to the mobile device 12 such as smart glasses, a watch, or other such device may be utilized to signal intent to mobile device 12 where the user performs an action with the connected device such as a movement, a tapping with their finger, etc. Alternatively, or in addition, the mobile device 12 may be utilized to display an augmented reality view in which items, e.g. the access controls 16 to which the user has access or doors to which the user has access, glow, or are otherwise highlighted and the user indicates on the view which door or resource to they want to access.

Alternatively, or in addition, a user may signal personal intent 700 by actually signaling non-intent. In the example above, if the mobile device 12 provides haptic feedback (e.g. vibrates) when in proximity to an access control 16, if the user does not provide a response tap or other gesture within a timeframe, then the user is signaling non-intent. Additionally, specific gestures or tap sequences could be used to signal non-intent such as a side-to-side gesture to indicate 'no' versus an up-and-down gesture that would indicate 'yes.' Or, a tap sequence such as a multi-tap in quick succession—say two taps within a 1 second time period would indicate non-intent. Non-intent may be signaled with a specific voice command or word.

Alternatively, or in addition, behavioral intent 800 may be inferred to provide additional information to the mobile device 12 to facilitate identification of the accessible access control 16 for the anticipation of user intent. In one example, behavioral intent of an employee may be determined by identifying time of day, route, GPS location, proximity to the access control 16, prior behavior, and/or other persons who are queued up adjacent to the user. In this example, by using prior behavior as to which access control 16 was accessed previously the user intent can be inferred as desiring to again access the same access control again when in proximity. Also in this example, the time of day that a user is near an access control can signal intent whereby, for example, they typically want to enter a building in the morning or at noon and thus when in proximity during these known time intervals they will automatically signal intent. Further, if the time of day is coupled with a scheduled arrival the addition of time of day plus schedule plus proximity could resolve to a specific intent to open an access control 16. Further, if other persons are nearby with other mobile device 12 where the other devices are signaling intent to open a particular access control 16, a user intent can be inferred when a user's mobile device 12 is in proximity to the access control 16 as it is now 'their turn' to open the door. In this example, the multiple mobile device 12 may send messages to each other, for example via short-range BTLE advertisements, to signal their activity to the group around that is in close proximity to the same location as the user's mobile device 12.

Alternatively, or in addition, communication intent 900 may be utilized to communicate additional information to the mobile device 12 to facilitate identification of the accessible access control 16 for anticipation of user intent. For example, communication with a passenger conveyance system such as an elevator may be utilized to identify the destination floor to filter the list of accessible access controls 16 to which the mobile device 12 provides access. This is useful when access controls 16 can transmit with a strong enough signal between floors and the filtering can remove any access control 16 from a list that is not on the current floor. Alternatively, the user may indicate a desired destination (e.g. "my office" or "floor 5", etc.) and the mobile device 12 may communicate a destination to or from the passenger conveyance such that the indicated destination of the mobile device 12 may then be utilized to further exclude certain access controls 16 because the destination would directly or indirectly specify a particular floor of the building.

In another example, a first access control 16 may be accessed that provides authorization to use a passenger conveyance system such as an elevator and the access control system may automatically call an elevator using a default floor associated with the user. The automatic call and destination floor would provide communication intent 900 and can be utilized to further filter the list of secondary access controls 16. In addition, the communication intent 900 could be applied for some time period after the communication was made—for example the filtering by floor could be performed for a time period, or until such a time as a further communication intent 900 is provided.

In another example, multiple mobile devices 12 in close proximity may send messages to each other, for example via short-range BTLE advertisements, to share a communication intent 900 to the group around that is in close proximity to the same location as the user's mobile device 12. Further, the messages sent between user mobile device 12 may include an indication of the floor that the users are currently on, or the building they are in, or in general, some information that provides location awareness to the user's mobile device 12. Further, the communication between user mobile devices 12 may simply be to repeat the communication received from a passenger conveyance system.

Further, if the communication intent 900 includes the capability for the mobile device 12 to be aware of location (e.g. basic determination such as inside a building versus outside, or inside a room or outside, or precise location within a premise) then the user intent can be inferred based on the resource that the access control 16 is on. In one example, a door that is intended to be opened and walked through so a user on the inside of the door would not need to open the door for ingress if they are already on the inside of the building or room. Egress is typically handled separately from an access control system.

The determination of intent facilitates interacting with multiple access controls to facilitate automatic ways for a user to have access to particular access controls. The determination of intent also minimizes otherwise more extensive interaction with the mobile device to operate the access control. Further, the apparent time to open the access control is decreased by essentially anticipating user intent and at least partially automating initiation of the process.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method of advertisement filtering, comprising:
receiving advertisements from each of a multiple of locks on a mobile device;
filtering the received advertisements based on a downloaded set of credential on the mobile device such that the received advertisements not associated with the set of credentials downloaded to the mobile device are filtered out, wherein the filtering is based on an identifier contained in the lock advertisement message and matching this identifier against an identifier contained in, or associated with, a credential stored in the mobile device;
comparing the filtered received advertisements on the mobile device; and
determining a user intent to access a particular lock from each of the multiple of locks in response to the comparing and to a behavioral intent on the mobile device, wherein the behavioral intent comprises a prior behavior of a user and the proximity between the mobile device and each of the multiple of locks.

2. The method as recited in claim 1, wherein the mobile device is a smartphone.

3. The method as recited in claim 1, further comprising sorting the filtered received advertisements based on a RSSI (received signal strength indicator).

4. The method as recited in claim 1, wherein the prior behavior includes a time of day which the user had previously accessed the lock.

5. The method as recited in claim 1, wherein the prior behavior includes a route previously taken by the user.

6. The method as recited in claim 1, wherein the prior behavior includes a location at which the user had previously accessed the lock.

7. The method as recited in claim 1, wherein the behavioral intent comprises a proximity to other users.

8. The method as recited in claim 1, wherein the behavioral intent is related to the most accessed lock.

9. The method as recited in claim 1, wherein the behavioral intent is inferred to provide additional information to the mobile device to facilitate identification of the accessible lock for the anticipation of user intent.

10. The method as recited in claim 1, wherein the behavioral intent comprises identification of other persons who are queued up adjacent to the user.

11. The method as recited in claim 1, wherein the behavioral intent comprises time of day, schedule, and proximity.

12. The method as recited in claim 1, wherein the behavioral intent comprises a multiple of mobile device send messages to each other to signal activity to a group that is in close proximity to the same location as the user's mobile device.

13. An access control system, comprising:
a multiple of locks; and
a mobile device in communication with the multiple of locks, the mobile device operable to determine a user intent to access a particular lock of the multiple of locks based at least in part on a behavioral intent, wherein the behavioral intent comprises a prior behavior of a user and the proximity between the mobile device and each of the multiple of locks, the mobile device containing instructions comprising:
receiving advertisements from each of a multiple of locks on a mobile device;
filtering the received advertisements based on a downloaded set of credential on the mobile device such that the received advertisements not associated with the set of credentials downloaded to the mobile device are filtered out, wherein the filtering is based on an identifier contained in the lock advertisement message and matching this identifier against an identifier contained in, or associated with, a credential stored in the mobile device;
comparing the filtered received advertisements on the mobile device; and
determining a user intent to access a particular lock from each of a multiple of locks in response to the comparing and to a behavioral intent on the mobile device, wherein the behavioral intent comprises a prior behavior of a user and the proximity between the mobile device and each of the multiple of locks.

14. The system as recited in claim 13, wherein the behavioral intent is based at least in part on an accelerometer in the mobile device.

15. The system as recited in claim 13, wherein the behavioral intent is based at least in part on a GPS in the mobile device.

16. The system as recited in claim 13, wherein the behavioral intent is based at least in part on a time of day which the user had previously accessed the lock.

17. The system as recited in claim 13, wherein the behavioral intent is based at least in part on a location of the mobile device at which the user had previously accessed the lock.

18. The system as recited in claim 13, wherein the behavioral intent is related to the most accessed lock.

* * * * *